United States Patent
Li et al.

(10) Patent No.: US 9,811,446 B2
(45) Date of Patent: Nov. 7, 2017

(54) METHOD AND APPARATUS FOR PROVIDING TEST CASES

(71) Applicant: INTERNATIONAL BUSINESS MACHINES CORPORATION, Armonk, NY (US)

(72) Inventors: Qi Cheng Li, Beijing (CN); Li Jun Mei, Beijing (CN); Jian Wang, Beijing (CN); Fang Quan Xie, Beijing (CN); Zi Yu Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 14/298,239

(22) Filed: Jun. 6, 2014

(65) Prior Publication Data
US 2015/0007146 A1    Jan. 1, 2015

(30) Foreign Application Priority Data

Jun. 26, 2013  (CN) .......................... 2013 1 0257810

(51) Int. Cl.
G06F 9/44       (2006.01)
G06F 11/36      (2006.01)
G06F 11/34      (2006.01)

(52) U.S. Cl.
CPC ...... *G06F 11/3684* (2013.01); *G06F 11/3466* (2013.01)

(58) Field of Classification Search
CPC ........... G06F 2201/865; G06F 11/3466; G06F 11/3636; G06F 2221/033; G06F 11/3668
See application file for complete search history.

(56) References Cited

U.S. PATENT DOCUMENTS 5,761,408 A      6/1998   Kolawa et al.
6,305,010 B2 *  10/2001   Agarwal .................. G06F 8/52
                                                        717/126

(Continued)

FOREIGN PATENT DOCUMENTS

CN      02750153 A     10/2012
CN     102831060 A     12/2012

(Continued)

OTHER PUBLICATIONS

Gregory Matthews et al.; Backtracking and Re-execution in the Automatic Debugging of Parallelized Programs; 2002 IEEE; 11 pages;   <http://ieeexplore.ieee.org/stamp/stamp.jsp?arnumber=1029913>.*

(Continued)

*Primary Examiner* — Thuy Dao
*Assistant Examiner* — Cuong V Luu
(74) *Attorney, Agent, or Firm* — Cantor Colburn LLP; Rabin Bhattacharya

(57) ABSTRACT

A method and apparatus for providing a test case for a modified program. The method includes the steps of: obtaining a modification item that makes modification on a previous version of the program; locating the modification item after a first instrument and before a second instrument of a plurality of instruments inserted into the program; obtaining an execution path of the modified program that is between the first instrument and the second instrument and associated with the modification as well as a constraint set corresponding to the execution path; obtaining an execution result, outputted by the first instrument, of executing the previous version of the program using an original test case; and determining a test case applicable for the execution path based on the execution result and the constraint set. The apparatus corresponds to the method.

12 Claims, 4 Drawing Sheets

(56) References Cited

U.S. PATENT DOCUMENTS

| | | | | |
|---|---|---|---|---|
| 6,721,941 | B1* | 4/2004 | Morshed | G06F 11/3612 709/217 |
| 7,272,826 | B2* | 9/2007 | Bates | G06F 11/362 714/E11.207 |
| 7,873,944 | B2* | 1/2011 | Bangel et al. | 717/124 |
| 8,065,255 | B2* | 11/2011 | Colena et al. | 706/46 |
| 8,230,401 | B2 | 7/2012 | Branca et al. | |
| 8,479,171 | B2* | 7/2013 | Ghosh | G06F 11/3684 717/124 |
| 2002/0184615 | A1* | 12/2002 | Sumner | G06F 8/427 717/130 |
| 2003/0061599 | A1* | 3/2003 | Bates | G06F 11/362 717/129 |
| 2003/0093716 | A1* | 5/2003 | Farchi | G06F 11/3676 714/34 |
| 2003/0106046 | A1* | 6/2003 | Arnold | G06F 11/3624 717/129 |
| 2004/0117771 | A1 | 6/2004 | Venkatapathy | |
| 2004/0133882 | A1* | 7/2004 | Angel | G06F 11/3612 717/130 |
| 2004/0154001 | A1* | 8/2004 | Haghighat | G06F 11/3688 717/130 |
| 2004/0225920 | A1* | 11/2004 | Bates | G06F 11/362 714/38.13 |
| 2005/0223361 | A1* | 10/2005 | Belbute | G06F 11/3688 717/124 |
| 2007/0168988 | A1* | 7/2007 | Eisner | G06F 9/44589 717/126 |
| 2007/0240116 | A1* | 10/2007 | Bangel | G06F 11/3664 717/124 |
| 2009/0172643 | A1* | 7/2009 | Maruchi | G06F 11/3676 717/126 |
| 2010/0121802 | A1* | 5/2010 | Colena et al. | 706/46 |
| 2011/0161936 | A1 | 6/2011 | Huang et al. | |
| 2011/0214106 | A1* | 9/2011 | Qi | G06F 11/3409 717/124 |
| 2011/0289488 | A1* | 11/2011 | Ghosh | G06F 11/3684 717/131 |
| 2012/0192169 | A1 | 7/2012 | Li et al. | |
| 2012/0198423 | A1* | 8/2012 | Bestgen | G06F 11/3636 717/128 |
| 2012/0210298 | A1* | 8/2012 | Hodgins | G06F 8/71 717/113 |
| 2014/0157240 | A1* | 6/2014 | Baca | G06F 11/3612 717/130 |

FOREIGN PATENT DOCUMENTS

| | | |
|---|---|---|
| CN | 102915271 A | 2/2013 |
| CN | 103136103 A | 6/2013 |

OTHER PUBLICATIONS

Shyh-Kwei Chen et al.; Reversible Debugging Using Program Instrumentation; 2001 IEEE; pp. 715-727; <http://ieeexplore.ieee.org/stamp/stamp.jsp?arnumber=940726>.*

Lucas Layman et al.; Debugging Revisited; 2013 IEEE; pp. 383-392; <http://ieeexplore.ieee.org/stamp/stamp.jsp?arnumber=6681382>.*

Chandrasekhar Boyapati et al.; Korat Automated Testing Based on Java Predicates; 2002 ACM; pp. 123-133; <http://dl.acm.org/citation.cfm?id=566191>.*

Kenneth L. McMillan; Lazy Annotation for Program Testing and Verification; 2010 Springer; pp. 104-118; <https://link.springer.com/chapter/10.1007/978-3-642-14295-6_10>.*

Wang Linzhang et al.; Generating Test Cases from UML Activity Diagram based on Gray-Box Method; 2004 IEEE; 8 pages; <http://ieeexplore.ieee.org/stamp/stamp.jsp?arnumber=1371930>.*

Sudheendra Hangal et al.; Tracking Down Software Bugs Using Automatic Anomaly Detection; 2002 ACM; pp. 291-301; <http://dl.acm.org/citation.cfm?id=581377>.*

Chin-Yu Huang et al.; An Assessment of Testing-Effort Dependent Software Reliability Growth Models; 2007 IEEE; pp. 198-211; <http://ieeexplore.ieee.org/stamp/stamp.jsp?arnumber=4220785>.*

Katerina Goseva-Popstojanova et al.; Large Empirical Case Study of Architecture—based Software Reliability; 2005 IEEE; 10 pages; <http://ieeexplore.ieee.org/stamp/stamp.jsp?arnumber=1544720>.*

Stephen H. Edwards; Using Software Testing to Move Students from Trial-and-Error to Reflection-in-Action; 2004 ACM; pp. 26-30; <http://dl.acm.org/citation.cfm?id=971312>.*

Tielei Wang et al.; TaintScope a Checksum-Aware Directed Fuzzing Tool for Automatic Software Vulnerability Detection; 2010 IEEE; pp. 497-512; <http://ieeexplore.ieee.org/stamp/stamp.jsp?arnumber=5504701>.*

Connie U. Smith et al.; Best Practices for Software Performance Engineering; 2003 perfeng.com; 10 pages; <http://perfeng.com/papers/bestprac.pdf>.*

Barisas, et al., Automated Regression Testing using Symbolic Execution, Electronics and Electical Engineering, Apr. 12, 2011. No. 6(112), pp. 101-105.

Trudso, et al., Efficient Test Case Generation, Reliable Software and Architecture Project, Dept. of Computer Science, University of Aarhus, Mar. 19, 2010.

Ye, et al., Regression Test Cases Generation Based on Automatic Model Revision, International Symposium on Theoretical Aspects of Software Engineering 2012, pp. 127-134.

Rapos, Understanding the Effects of Model Evolution Through Incremental Test Case Generation for UML-RT Models, Masters Thesis, Queen's University, Kingston, Ontario, Canada, Sep. 2012.

Boghdady, et al., "Test Case Generation and Test Data Extraction Techniques", International Journal of Electrical & omputer Sciences, Jun. 2011, vol. 11, No. 03, pp. 82-89.

* cited by examiner

METHOD AND APPARATUS FOR PROVIDING TEST CASES

CROSS-REFERENCE TO RELATED APPLICATION

This application claims priority under 35 U.S.C. §119 from Chinese Patent Application No. 201310257810.0 filed Jun. 26, 2013, the entire contents of which are incorporated herein by reference.

BACKGROUND OF THE INVENTION

Field of the Invention

The present invention relates to test cases for software testing, and more specifically, to a method and apparatus for providing test cases.

Brief Description of Related Art

In the process of software development, developers write source codes of programs for functions to be implemented by software, and then testers use test cases to test software built based on source codes. It can be understood that a program usually constructs a plurality of flow branches by using, for example, condition judgment and jump statement, so as to form a plurality of execution paths. Therefore, it is desired to select appropriate test cases to constitute a test suite so that respective test cases in the test suite can correspond to different flow branches, cover different execution paths, and thus test various possible execution conditions of the program comprehensively. To this end, in the prior art, a method of symbolic execution has been proposed to analyze the execution process of a program. This method can be used to generate appropriate test cases for a program.

In the method of symbolic execution, Control Flow Graph, CFG, is constructed for a program to be tested. CFG is an abstract data structure using a directional graph to represent a program process. FIG. 1 exemplarily shows a program's control flow graph and corresponding execution paths thereof. Specifically, FIG. 1 contains a plurality of nodes and a plurality of directed edges connecting the nodes, wherein each node Ni represents a program basic block, that is, a sequential statement code block having no jump therein, and each directed edge Ei represents a jump in the program and connects two basic blocks (i.e., nodes) that act as the start point and end point of the jump respectively. Since a jump in a program is usually defined through an execution condition, a directed edge corresponds to an execution condition of jumping from the start node to the end node of the directed edge. For example, in a specific example, a plurality of variables including x and y are defined in a program. After executing node $N_1$, the program judges values of variables x and y. If $(x+y)>=0$, then it jumps to node $N_2$; if $(x+y)<0$ and $y>0$, then it jumps to node $N_3$. Then, directed edge $E_1$ corresponds to the execution condition $(x+y)>=0$; and directed edge $E_2$ corresponds to the execution condition $(x+y)<0$ and $y>0$. By connecting different nodes via different directed edges, different execution paths can be formed. Specifically, FIG. 1 further shows different combinations of directed edges corresponding to different execution paths; for example, the execution path $p_1$ executes a series of nodes $N_1$, $N_2$, $N_6$, $N_5$, $N_f$ via directed edges $E_0$, $E_1$, $E_3$, $E_7$ and $E_9$. As mentioned before, each directed edge corresponds to an execution condition of jumping from the start node to the end node of the directed edge. Therefore, each execution path pi can correspond to an execution condition set, or called a constraint set, defined by a combination of directed edges. If the constraint set has no solution, it means the execution path pi is not reachable. For a reachable path, by solving the constraint set, a condition range for the program to execute the path pi can be obtained. Further, a test case ti can be generated within the condition range. In this way, respective parameters in the test case ti are in compliance with the condition range of the path pi, and then, when using the test case ti for test, the program will certainly conduct the execution along the path pi, and thus the test on the path pi is implemented. That is to say, the test case ti is a test case applicable for the execution path pi. In the same way, different test cases can be generated for respective different execution paths of the program. Then, the different test cases generated can cover different execution paths to meet the requirements of comprehensive testing.

However, in order to meet various needs of users for software functions, many programs have complex logics and a large number of process branches. It can be understood that each time there is a process branch increased, new execution paths will be generated through combination on the basis of the original execution paths. Therefore, the number of execution paths grows exponentially as the number of branches increases. A large number of process branches can generate a huge number of execution paths, and this is also called path state space explosion. For such cases, the method of generating test cases for respective execution paths by solving the constraint sets thereof one by one becomes unpractical because of low efficiency.

On the other hand, the development of software program is finished step by step. Developers (usually a number of developers for large software) continue to submit modification tracks to the program source code, so as to modify, supplement and improve the source code. In order to assure that a software program modified several times can run normally, it is needed to perform regression testing on the software program to determine which modification track causes problems for the program. According to the prior art, in the process of regression testing, the same test suite is used to test different versions of the program. However, in practice, each modification to the program is likely to cause a change in execution paths of the program. Therefore, it is possible that a test case applicable for a specific execution path in the original version of the program can no longer be applicable for the modified program, while on the contrary, an applicable test case could not be found for a new execution path generated due to a program change. Therefore, it is desired to update the test suite for the modified program, to provide applicable test cases. However, as mentioned before, on one hand, logics of programs are more and more complex, and the number of execution paths is huge; on the other hand, programs are modified very frequently. These two factors make regenerating test cases for each modification of the program very costly.

Therefore, it is desired to propose a new solution, which can provide an applicable test case for a modification of the program more effectively.

SUMMARY OF THE INVENTION

In view of the problems mentioned above, there is provided the present invention, which intends to provide a solution capable of providing an applicable test case for a modified program on the basis of original test cases, so as to overcome at least part of the problems in the prior art.

According to one embodiment of the present invention, there is provided a method for providing a test case for a modified program, including: obtaining a modification item which makes a modification on a previous version of the program; locating the modification item after a first instrument and before a second instrument of a plurality of instruments inserted into the program; obtaining an execution path of the modified program that is between the first instrument and the second instrument and associated with the modification as well as a constraint set corresponding to the execution path; obtaining an execution result, outputted by the first instrument, of executing the previous version of the program using an original test case; and determining a test case applicable for the execution path based on the execution result and the constraint set.

According to another embodiment, there is provided an apparatus for providing a test case for a modified program, including: a modification item obtaining unit configured to obtain a modification item which makes a modification on a previous version of the program; a locating unit configured to locate the modification item after a first instrument and before a second instrument of a plurality of instruments inserted into the program; a path obtaining unit configured to obtain an execution path of the modified program that is between the first instrument and the second instrument and associated with the modification as well as a constraint set corresponding to the execution path; an execution result obtaining unit configured to obtain an execution result, outputted by the first instrument, of executing the previous version of the program using an original test case; and a determining unit configured to determine a test case applicable for the execution path based on the execution result and the constraint set.

With the method and the apparatus, based on the original test case, an applicable test case is provided for a modified part of the program. Since the regeneration of new test cases for the overall program is avoided, the efficiency of providing test cases is improved, and accordingly, the regression test process of the program is promoted.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
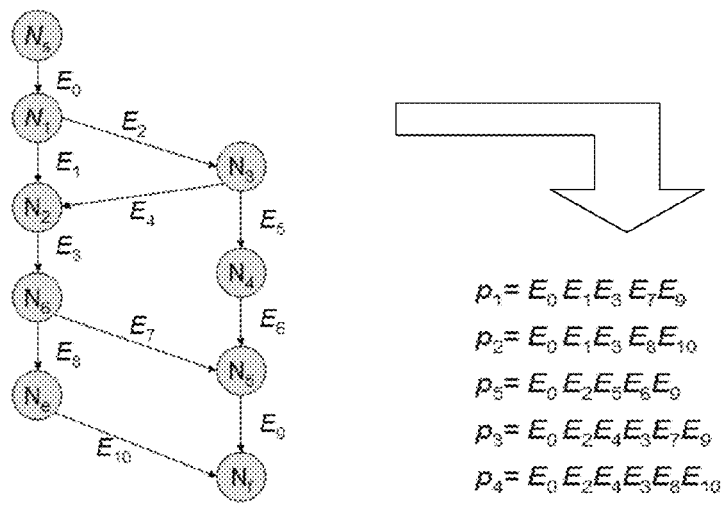
FIG. 1 exemplarily shows a program's control flow graph and a corresponding execution path thereof.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any applicable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any applicable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any applicable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any applicable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

Figure 2:
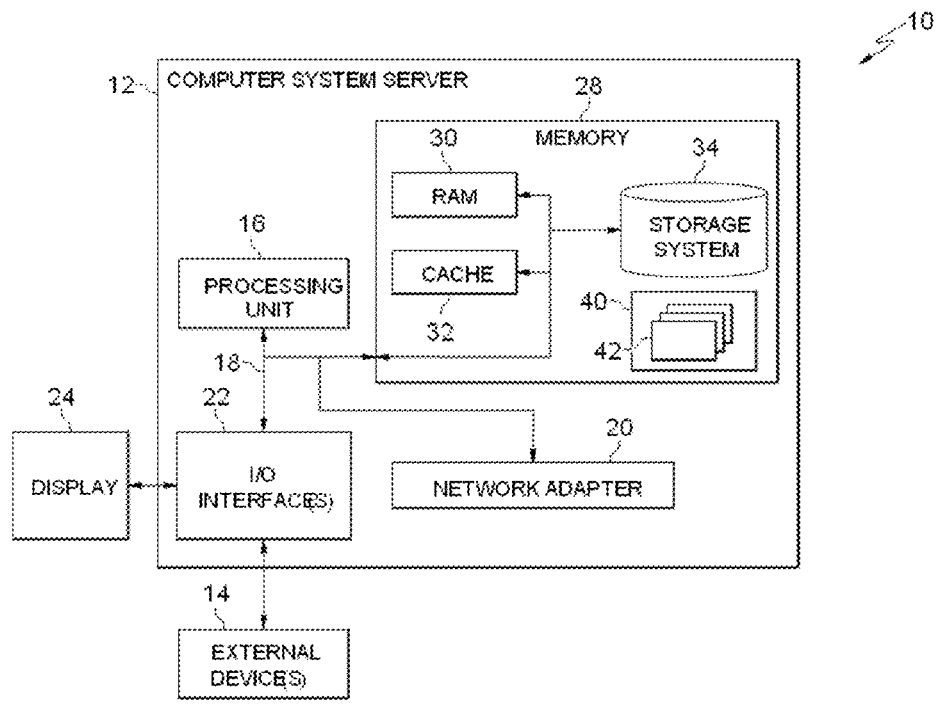
FIG. 2 shows a block diagram of an exemplary computer system 100/server 12 which is applicable to implement the embodiments of the present invention.

As shown in FIG. 2, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Various embodiments of the present invention are described below in combination with the accompanying figures. In these embodiments, a plurality of instruments are inserted in the program for detecting and outputting execution state information of the program. In a case where the program is modified, the modification is located between two instruments inserted into the program, for example, after a first instrument and before a second instrument, and the execution path of the modified program between the two instruments is obtained. Thus, the execution path associated with the modification is "extracted" from the overall program. On the other hand, an execution result of the program at the first instrument before modification, that is, an execution result of the previous version of the program at the beginning of the execution path, is obtained. Then, with the method of symbolic execution and considering the constraint set of the execution path in combination with the execution result, a test case applicable for the above execution path can be determined.

Figure 3:
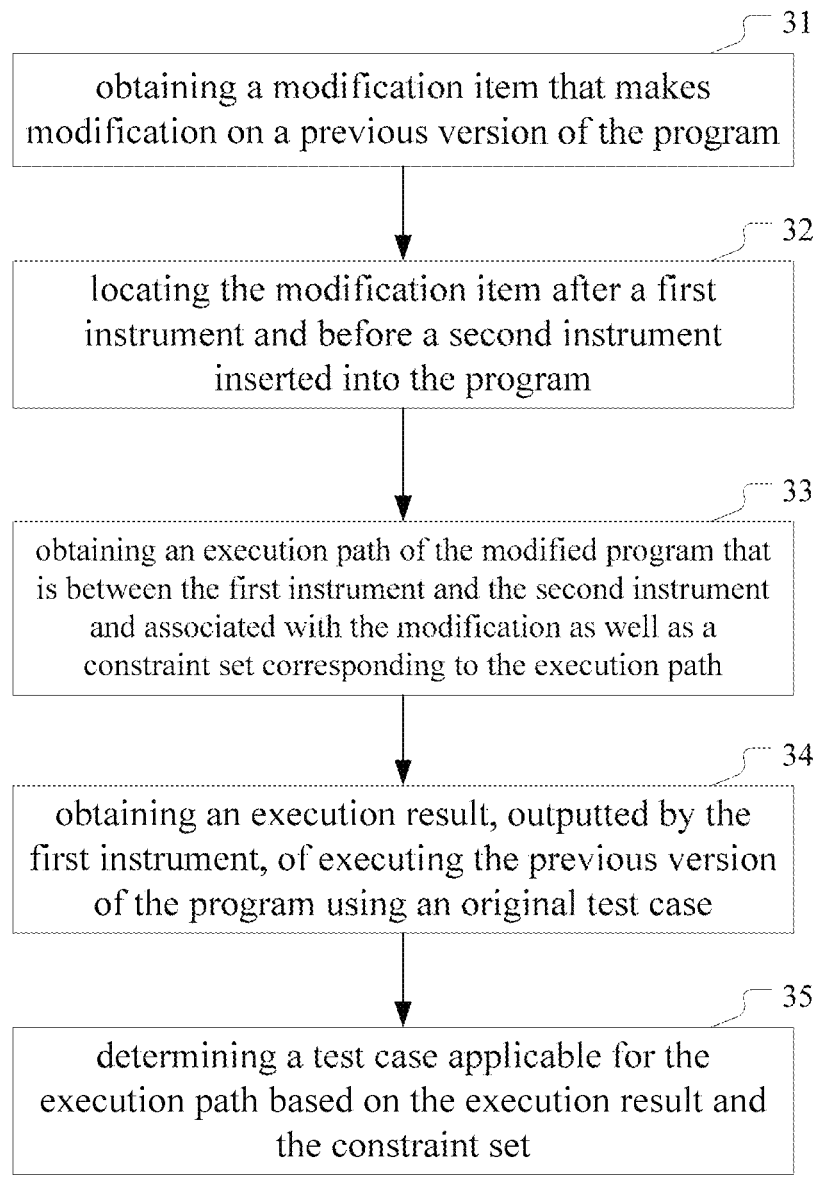
FIG. 3 shows a flow chart of a method for providing test cases for a modified program according to one embodiment of the present invention.

Now reference is made to FIG. 3, which shows a flow chart of a method for providing a test case for a modified program according to one embodiment of the present invention. As shown, the method for providing test cases in this embodiment includes the following steps: step 31 of obtaining a modification item that makes a modification on a previous version of the program; step 32 of locating the modification item after a first instrument and before a second instrument of a plurality of instruments inserted into the program; step 33 of obtaining an execution path of the modified program that is between the first instrument and the second instrument and associated with the modification as well as a constraint set corresponding to the execution path; step 34 of obtaining an execution result, outputted by the first instrument, of executing the previous version of the program using an original test case; and step 35 of determining a test case applicable for the execution path based on the execution result and the constraint set. The implementation of the respective steps is described below in combination with specific examples.

First, in step 31, a modification item that modifies the previous version of the program is obtained. In one example, a modification item corresponds to a modification to one line of program code. In another example, a modification item corresponds to a modification to one program block or one execution condition of a program. In a case of abstracting the program execution process into a control flow graph using symbolic execution, a modification item can correspond to a modification to one node or one directed edge of a program.

For simplicity, assuming that the previous version of the program that has passed the test is v1. Accordingly, the program of version v1 has a corresponding test suite T1, which contains a plurality of test cases applicable for different execution paths of the version v1 of the program respectively. As mentioned before, in the process of software development, developers will continue to submit modification tracks to modify the program code. In general, a modification track can include several modification items. Assuming that after the program of version v1 passes the test, developers submit a plurality of modification tracks respectively, forming the program of version v2.

Usually, the submitted modification tracks can be managed through a track knowledge base, or called version management system. Examples of the version management system include ClearCase, CVS, Endevor, RTCz etc. The version management system herein can track and manage information of respective modification tracks. Such information includes submitters of the modification tracks, time of submitting the modification tracks, and information of respective modification items in the modification tracks. The information of modification items can include position of modification, specific content of modification, etc. In one embodiment, information of modification track can be obtained through the version management systems, and information of modification item can be further obtained to execute step 31. In another embodiment, in step 31, the submission of modification tracks by developers can be captured directly, so as to obtain the modification item. In another embodiment, in step 31, information of the modification item can also be obtained by directly scanning and comparing codes of the previous version v1 and of the current version v2.

As to the obtained modification item, in step 32, the modification item is located after a first instrument and before a second instrument of a plurality of instruments inserted into the program. To execute step 32, it is required to pre-execute the step of inserting the instruments in the program. In the field of software test, inserting instruments in a program (also known as "instrumentation") to monitor the execution state of the program is a test method commonly used. In general, an instrument can detect runtime state information at the position of the instrument, and outputs a relevant result. In one embodiment, multiple instruments are inserted in the source code of the program. In another embodiment, the instruments are inserted in intermediate code generated based on the source code of the program, to track the execution of a test case without changing the source code. Since the method of inserting instruments has been well known in this field, details like code forms of instruments, insertion process, etc., are omitted here. It should be noted that, to make the inserted instruments be better applied to the method of the embodiments of the invention, attention should be paid to insertion intervals and insertion positions of the instruments. In fact, inserting a plurality of instruments in the program is equivalent to dividing the overall program into program segments of different lengths by instrument positions, so as to implement monitoring and control of the program segment by segment. Therefore, appropriate instrument intervals correspond to program segments of appropriate lengths. In case of too small instrument interval, the divided program segments will be too short, and accordingly, an excessive number of instruments will affect the execution efficiency of the program. However, in case of too large instrument interval, the divided program segments will be too long, and can hardly achieve the purpose of segmental monitoring and control. Therefore, the insertion intervals and insertion positions of instruments should be determined according to characteristics of the program itself like length and branches. In one embodiment, the step of inserting instruments is executed as a part of the method of the present invention before steps 31,32 in FIG. 3. In another embodiment, the step of inserting instruments is pre-executed before executing the method of the present invention, to provide a basis for execution of the method of the present invention.

On the basis that a plurality of instruments have been inserted in the program, in step 32, the modification item obtained in step 31 is located between two instruments inserted into the program. In particular, the instrument before the modification item among the two instruments is called the first instrument, and the instrument located after the modification item is called the second instruments, or in other words, the modification item is located after the first instrument and before the second instrument. In one embodiment, in step 32, by back tracking the program code from the position of the modification item, the instrument firstly encountered can be determined as the above first instrument; similarly, by going forward along the program code from the position of the modification item, the instrument firstly encountered can be determined as the above second instrument. That is to say, the first instrument and the second instrument are two instruments nearest to the modification item and located before and after the modification item respectively, and there is no other instrument between the first instrument and the second instrument. However, this is not necessary. In other embodiments, other two instruments can also be taken as the first instrument and the second instrument, as long as program segments defined by the two instruments contain the modification item.

On a basis that the first instrument and the second instrument have been located, in step 33, an execution path, associated with the modification, of the modified program between the first instrument and the second instrument as well as a constraint set corresponding to the execution path are obtained. In one embodiment, a specific program segment between the first instrument and the second instrument is first obtained, and then an execution path corresponding to the specific program segment is determined. As mentioned before, instruments inserted into the program may divide the overall program into several program segments. Accordingly, the first instrument and the second instrument define a specific program segment containing the modification item therein. For the specific program segment, an execution path corresponding to the specific program segment can be obtained using the manner of symbolic execution in the prior art. Alternatively, in another embodiment, the complete execution path of the overall program can be obtained first, and then the execution path between the first instrument and the second instrument is extracted from the complete execution path. As known to those skilled in the art, the execution path defines the execution order and execution conditions (directed edges connecting the nodes) of respective program blocks (nodes in the control flow graph). By combining execution conditions between program blocks, the constraint set corresponding to the execution path can be obtained. Thus, in step 33, an execution path associated with the modification item is extracted from the overall program, and the constraint set corresponding to the execution path is obtained.

Figures 4A, 4B:
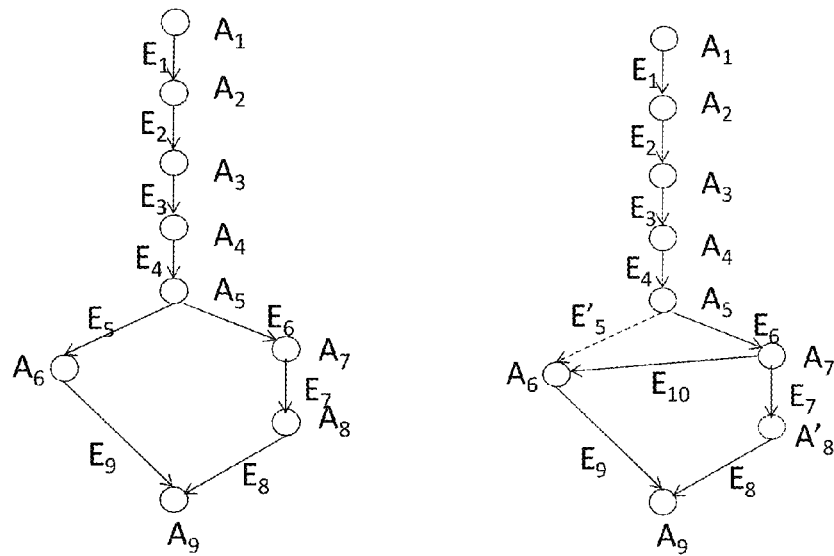
FIG. 4 schematically shows a control flow graph and execution paths between two instruments.

It can be understood that the modified program can have many different execution paths between the first instrument and the second instrument. Also, since the program segment defined by the first instrument and the second instrument relates to the modification item, thus, at least a part of the execution paths between the first instrument and the second instrument is changed relative to the corresponding part of the previous version of the program. FIG. 4 schematically shows a control flow graph and execution paths between two instruments. Specifically, the first instrument is located before node A1, and the second instrument is located after node A9. FIG. 4A shows a control flow graph of the previous version v1 of the program between the first instrument and the second instrument. According to the flow control graph, there are two execution paths p1 and p2 for the previous version of the program between the first instrument and the second instrument, wherein p1 executes a node sequence A1-A2-A3-A4-A5-A6-A9 via directed edges E1, E2, E3, E4, E5, E9, and p2 executes a node sequence A1-A2-A3-A4-A5-A7-A8-A9 via directed edges E1, E2, E3, E4, E6, E7, E8. Assuming that after modification, a modified version, namely, the current version v2 of the program, is formed. FIG. 4B shows a control flow graph of the modified program between the first instrument and the second instrument. As shown, compared to the previous version v1, the version v2 modifies the condition for connecting A5 and A6, that is, modifies the directed edge E5 to E5', adds the directed edge E10 for connecting A7 and A6, and modifies node A8 to A8'. Thus, there are three execution paths p1', p2' and p3 for the modified program between the first instrument and the second instrument, wherein the path p1' executes a node sequence A1-A2-A3-A4-A5-A6-A9 via directed edges E1, E2, E3, E4, E5', E9, the path p2' executes a node sequence A1-A2-A3-A4-A5-A7-A8'-A9 via directed edges E1, E2, E3, E4, E6, E7, E8, and the path p3 executes a node sequence A1-A2-A3-A4-A5-A7-A6-A9 via directed edges E1, E2, E3, E4, E6, E10, E9.

In the three paths, compared to the path p1 of the previous version, the path p1' executes the same node sequence via a different combination of directed edges. As to that, the execution path with modified execution condition but executing the same node sequence relative to the original execution path is called a modified execution path. Therefore, the modified execution path p1' corresponds to the original path p1. Compared with the path p2 of the previous version, the path p2' executes a similar node sequence (only with node A8 modified to A8') via the same combination of directed edges. Since the constraint set corresponding to the execution path is related only with the combination of directed edges, the path p2' actually has the same constraint set as the original path p2. In this sense, execution paths with identical execution conditions are called the same execution path. Therefore, it can be considered that the path p2' is not changed essentially relative to the original path p2. The path p3, compared with any original path, executes a completely different node sequence via a completely different combination of directed edges, and hence is called a newly created execution path.

In can be understood that FIG. 4 shows the execution paths between the first instrument and the second instrument only by way of example. In other examples, there can be a greater number of and more complicated execution paths between the two instruments. And, for an illustrative purpose, FIG. 4B shows several typical modifications at the same time. In other examples, the modification item can relate to a part of the modification types, or relate to other modification contents.

As shown exemplarily in FIG. 4, through the modification of the program, a plurality of execution paths between the first instrument and the second instrument are changed relative to the previous version. Thus, an original test case applicable for the previous version of the program may be no longer applicable for the execution path of the modified program, namely, the execution path obtained in step 33. To this end, in the following steps 34 and 35, based on the original test case, an applicable test case is determined.

Specifically, in step 34, an execution result is determined, which execution result is the result of executing the previous version of the program using an original test case and is outputted by the first instrument. As mentioned before, it can be assumed that the program of the previous version v1 has passed test, and the test suite used for the test is T1. The test suite T1 contains a plurality of test cases, applicable for different execution paths of the version v1 of the program respectively. Since there are already instruments inserted in the program, when the program of the version v1 is tested and executed using a certain test case t in T1, the inserted instruments can output the execution result at the positions of the instruments in runtime. Therefore, in step 34, by reading the outputs of the first instrument, the execution result at the first instrument when the previous version of the program is executed using the original test case in the original test suite can be obtained and recorded. The output execution result can include values, states, etc. of respective variables and parameters in the program when the program runs at the position of the first instrument. Since the first instrument is located at the beginning of the execution path obtained in step 33, such execution result can be taken as the initial condition for the execution path and be used in combination with the constraint set corresponding to the execution path to determine a test case applicable for the execution path, that is, to perform step 35.

Figure 5:
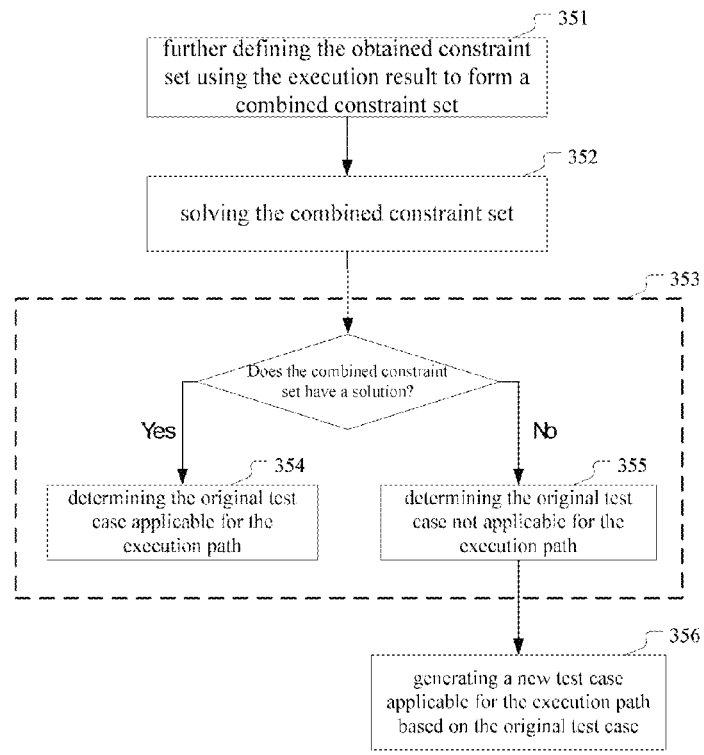
FIG. 5 shows substeps to determine an applicable test case.

FIG. 5 shows substeps to determine an applicable test case, namely, substeps of step 35. As shown in FIG. 5, first in step 351, the execution result obtained in step 34 is used to further define the constraint set obtained in step 33, thereby forming a combined constraint set; in step 352, the combined constraint set is solved; and in step 353, according to the result of the solution in step 352, it is judged whether the original test case is applicable for the execution path.

Specifically, assuming that the execution path p is obtained in step 33, and the corresponding constraint set thereof is C. On the other hand, the execution result R, outputted by the first instrument, of executing the previous version v1 of the program using the original test case t, is obtained in step 34. Thus, in the above step 351, the execution result R is taken as the initial condition of the constraint set C, that is, the execution result R is used to further define the constraint set C, thereby forming a combined constraint set C'. Then, in step 352, similar to solving a constraint set in the prior art, the combined constraint set C' is solved. The solving result can be used to judge whether the original test case t is applicable for the execution path p.

Figures 6, 7:
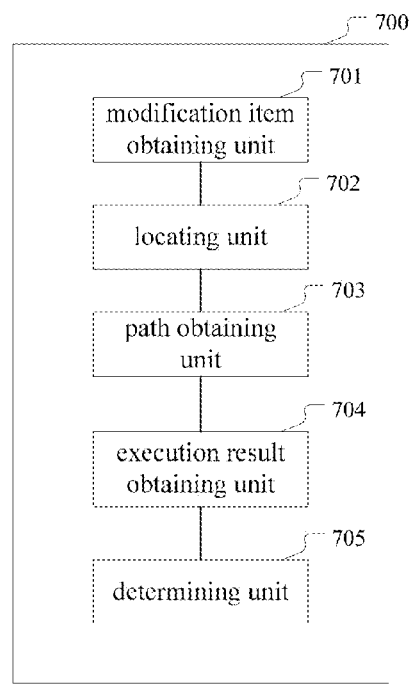
FIG. 6 schematically shows examples of a constraint set and of a combined constraint set.
FIG. 7 shows a block diagram of an apparatus for providing test cases according to one embodiment of the present invention.

FIG. 6 schematically shows examples of a constraint set and of a combined constraint set. Specifically, the left side of FIG. 6 shows a constraint set corresponding to a certain execution path p between the first instrument and the second instrument. The constraint set relates to a plurality of variables, and defines the relationship between the variables. In these variables, variables defined before the first instrument, such as variables a and b, are called global variables and are marked with "global"; while variables newly defined after the first instrument, such as variables x, y, x, are called local variables and are marked with "local". Since the global variables are defined before the first instrument, when the program is executed at the first instrument using a test case, the global variables can be given specific states or values. It is assumed that, when the program of the version v1 is executed using the original test case t, the execution result R outputted by the first instrument includes a=5, b=6, as shown in FIG. 6. By combining the execution result R with the constraint set of the execution path p, the combined constraint set shown on the right side of FIG. 6 can be obtained. The combined constraint set is a condition set that has assigned values for part of the variables, and can be solved by using methods in the prior art. It can be understood that for the purpose of simplicity and clearness, only conditions relating to both global and local variables are shown in the constraint set in FIG. 6, with local conditions associated only with local variables omitted. The addition of local conditions does not affect solving the conditions associated with global variables. Also, FIG. 6 merely shows a specific example for illustration. In other embodiments, the execution result outputted by the first instrument can relate to more global variables.

For the combined constraint set as shown in FIG. 6, a conventional constraint set solving method can be used; then it is judged based on the solving result whether the original test case is applicable for the execution path. Specifically, according to the principle of symbolic execution, if the combined constraint set C' has a solution, it means the execution path p is still a reachable path in a case where an original test case t is executed, that is to say, the original test case t is applicable for the execution path p. Therefore, further in one embodiment, the judgment of step 353 includes step 354 of determining the original test case as a test case applicable for the execution path in a case where the combined constraint set has a solution. On the other hand, the judging step 353 can further include step 355 of determining the original test case as being not applicable for the execution path in a case where the combined constraint set has no solution.

In one embodiment, step 35 of determining an applicable test case further includes step 356 of generating a new test case applicable for the above execution path based on the original test case. Step 356 is typically applicable for the case where the original test case is not applicable for the execution path, and hence is shown in FIG. 5 to be executed after step 355. However, in one embodiment, step 356 can also be executed in a case where the original test case is applicable for the execution path, so as to further provide more applicable test cases for the execution path.

In general, to generate a new applicable test case, it still needs to consider the combined constraint set. Since the combined constraint set is based on the execution result of a test case and on the constraint set corresponding to the execution path, by modifying the execution result and/or the constraint set, it is possible to make the combined constraint set have a solution, thus generating a new test case. Specifically, in one embodiment, step 356 of generating a new test case includes modifying parameter settings related to the local variables in the constraint set to make the combined constraint set have a solution, and generating a new test case based on the modified parameter setting. The above process is described below with reference to the example shown in FIG. 6. As shown in FIG. 6, the constraint set corresponding to the execution path p at least relates to the global variables a and b, as well as the local variables x, y, z, and define relations between these variables. On the other hand, the execution result of the test case t defines global variable a=5, b=6. In one example, a certain local variable, such as x, is set to be read from a certain external file, or received from a user input. By modifying the parameter setting of this local variable, such as modifying the external file, or modifying the user input, this local variable can be made to have a different value, thus satisfying conditions in the combined constraint set (e.g. satisfying (local) x<(global) b=6), that is, making the combined constraint set to have a solution. In this case, by combining the original test case with the modified parameter setting, a new test case applicable for the execution path p can be obtained.

In another embodiment, step 356 of generating a new test case includes: modifying the execution result to make the combined constraint set to have a solution, performing backtracking from the first instrument using data flow analysis to determine a test case which generates the modified execution result, and taking such test case as a new test case. The process of the embodiment is described below still with reference to the example shown in FIG. 6. In FIG. 6, the execution result of the original test case t defines global variables a=5, b=6. Assuming that the execution result makes the combined constraint set shown in FIG. 6 have no solution. In particular, assuming in the case of b=6, the combined constraint set has no solution because the condition (local) x<(global) b therein can not be satisfied. Therefore, the execution result, especially the value of the global variable b, can be modified to make the combined constraint set to have a solution. For example, assuming that the combined constraint set has a solution if the execution result is modified to a=5, b=10. For such modified execution result, the method of data flow analysis can be used to backtrack the program from the position of the first instrument, thereby determining in turn what kind of test case can generate the execution result as modified hereinabove at the first instrument. In one embodiment, the length of backtracking can be set in advance, for example, backtracking length can be set as program segments of two instruments. In addition, the method of data flow analysis has already been well known in this field, and can be used for tracking the process of valuing respective variables, thereby determining a corresponding test case. Such determined test case which generates the modified execution result certainly can satisfy the conditions in the combined constraint set, and thus can be used as a new test case applicable for the execution path.

Although the specific example of generating a new test case is given hereinabove, the invention is not limited to the methods shown by the specific example. Those skilled in the art can modify and combine the methods described in detail to use more implementations to generate a new test case. Such modified and combined embodiments shall also be included within the concept of the invention.

In addition, as to steps shown in FIG. 5, it can be understood that in various embodiments, one can selectively perform part of the steps, or repeatedly perform certain steps many times. In one embodiment, for a specific execution path p, steps 351-353 of FIG. 5 can be executed for each test case in the original test suite respectively, to judge whether respective original test cases are applicable for the execution path p respectively. In another embodiment, once it is determined that a certain original test case is applicable for the execution path p, other test cases in the original test suite will no longer be judged; that is to say, it intends to guarantee that there is an original test case in the test suite applicable for the execution path p. In one embodiment, step 356 is executed only when it is determined that all the test cases in the original test suite are not applicable for the execution path p.

According to one embodiment, different processes are conducted for different execution paths. In one embodiment, the execution path p obtained in step 33 is identical with a certain original path in the previous version of the program. In this regard, an original test case applicable for the original path can be directly determined as a test case applicable for the execution path p. For example, the execution path p2' shown in FIG. 4 is identical with the original path p2 in the previous version. Therefore, a test case in the original test suite for the path p2 can be determined as a test case applicable for p2'.

In one embodiment, the execution path obtained in step 33 is a modified execution path corresponding to a specific original path of the previous version. For example, in FIG. 4, the execution path p1' is a modified execution path corresponding to the original path p1. In such case, it can be assumed that a specific original test case applicable for the specific original path (e.g. p1) in the original test suite is more likely applicable for the modified execution path (e.g. p1'). Therefore, the method of FIG. 5 is executed with respect to the specific original test case first. In one embodiment, in a case where the specific original test case is not applicable, step 356 is executed to generate a new test case based on the specific original test case, without judging other original test cases any more; in another embodiment, in a case where the specific original test case is not applicable, steps in FIG. 5 are further performed to judge other original test cases in the original test suite.

In one embodiment, the execution path obtained in step 33 is a newly created execution path, such as the execution path p3 in FIG. 4. In such case, steps 351-353 of FIG. 5 can be used, to judge one by one whether respective original test cases are applicable for the newly created execution path. Only if it is determined that all test cases in the original test suite are not applicable for the newly created execution path, step 356 is executed to generate a new test case.

It can be understood that the newly generated test case can be added into the test suite to update the test suite, so as to make it applicable for the modified program.

In one embodiment, test cases, which are determined as no longer needed by the modified program, are removed from the original test suite, so as to update the test suite. Specifically, for a specific original test case t, it is determined one by one for which execution path between the first instrument and the second instrument the original test case t is applicable. In a case where the original test case t is not applicable for any execution path, the original test case t is determined as an undesired test case and is deleted from the test suite T, to update the test suite T.

Through the above method, there is provided an applicable test case for the modified program.

Based on the same inventive concept, the invention further provides an apparatus for providing a test case. FIG. 7 shows a block diagram of an apparatus for providing a test case according to one embodiment of the present invention. As shown, the apparatus for providing a test case for the modified program is generally denoted as 700. Specifically, the apparatus 700 includes: a modification item obtaining unit 701 configured to obtain a modification item that makes modification on a previous version of the program; a locating unit 702 configured to locate the modification item after a first instrument and before a second instrument of a plurality of instruments inserted into the program; a path obtaining unit 703 configured to obtain an execution path of the modified program that is between the first instrument and the second instrument and associated with the modification as well as a constraint set corresponding to the execution path; an execution result obtaining unit 704 configured to obtain an execution result, outputted by the first instrument, of executing the previous version of the program using an original test case; and a determining unit 705 configured to determine a test case applicable for the execution path based on the execution result and the constraint set.

According to one embodiment, the apparatus 700 further includes an instrument inserting unit (not shown) configured to insert the plurality of instruments in the program.

According to one embodiment, the first instrument and the second instrument are instruments nearest to the modification item located before and after the modification item respectively. That is to say, there is no other instrument between the first instrument and the second instrument.

According to one embodiment, the determining unit 705 includes (not shown): a forming module configured to further define the constraint set using the execution result to form a combined constraint set; a solving module configured to solve the combined constraint set; a judging module configured to judge whether the original test case is applicable for the execution path according to the solving result.

According to one embodiment, the judging module is configured to, in a case where the combined constraint set has a solution, determine the original test case as the test case applicable for the execution path.

According to one embodiment, the judging module is configured to, in a case where the combined constraint set has no solution, determine the original test case not applicable for the execution path.

In one embodiment, the determining unit 705 also includes a generation module configured to generate a new test case applicable for the execution path based on the original test case.

According to one embodiment, the generation module is configured to: modify parameter settings related to local variables in the constraint set to make the combined constraint set have a solution; and generate a new test case based on the modified parameter setting.

According to one embodiment, the generation module is configured to: modify the execution result to make the combined constraint set have a solution; and perform backtracking from the first instrument using data flow analysis to determine a test case which generates the modified execution result and take the determined test case as the new test case.

According to one embodiment, the execution path is a modified execution path corresponding to the specific original path in the previous version of the program, and the original test case is applicable for the specific original path.

The specific implementations for the above units and modules correspond to the description of steps of FIGS. 3 and 5 and will no more be detailed herein. It can be understood that respective units in FIG. 7 are described by function. Although these units are shown in FIG. 7 as included in the apparatus 700, it does not mean that all units must be physically resident on the same platform or contained in the same software module. In one embodiment, the apparatus 700 acts as an independent apparatus or tool; in another embodiment, a part of units of the apparatus 700 can be incorporated into existing tools or modules.

With the method and apparatus of the embodiments of the invention, for a modified program, a modification-related path can be extracted from the overall program and a test case applicable for the modification-related path and thus for the modified program is determined based on an original test case. Thus, path state space explosion, which can be confronted with due to the regeneration of new test cases for the overall program, can be avoided, and hence the efficiency of providing test cases is improved.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a test case for a modified program, comprising:
    obtaining a modification item that modifies a previous version of the program;
    finding a first instrument of a plurality of instruments inserted into the program that is before the modification item;
    finding a second instrument of the plurality of instruments inserted into the program that is after the modification item;
    obtaining an execution path of the modified program that is between the first instrument and the second instrument and associated with the modification as well as a constraint set corresponding to the execution path;
    obtaining an execution result, outputted by the first instrument, of executing the previous version of the program using an original test case; and
    determining a test case applicable for the execution path based on the execution result and the constraint set; wherein determining a test case applicable for the execution path comprises:
        further defining the constraint set using the execution result to form a combined constraint set;
        solving the combined constraint set; and
        judging whether the original test case is applicable for the execution path according to the solving result; and further wherein the judging comprises, in a case where the combined constraint set has no solution, determining the original test case not applicable for the execution path;
        modifying parameter settings related to local variables in the constraint set to make the combined constraint set have a solution; and
        generating a new test case based on the original test case and the modified parameter settings.

2. The method according to claim 1, further comprising inserting the plurality of instruments in the program.

3. The method according to claim 1, wherein the first instrument and the second instrument are instruments nearest to the modification item located before and after the modification item respectively.

4. The method according to claim 1, wherein the judging comprises, in a case where the combined constraint set has a solution, determining the original test case as the test case applicable for the execution path.

5. The method according to claim 1, wherein the generating a new test case applicable for the execution path based on the original test case comprises:
    modifying the execution result to make the combined constraint set have a solution; and
    performing backtracking through the program from the first instrument using data flow analysis to determine a test case which generates the modified execution result and taking the determined test case as the new test case.

6. The method according to claim 1, wherein the execution path is a modified execution path corresponding to a specific original path in the previous version of the program, and the original test case is applicable for the specific original path.

7. An apparatus for providing a test case for a modified program, comprising:

a modification item obtaining unit configured to obtain a modification item that makes modification on a previous version of the program;
a first finding unit configured to find a first instrument of a plurality of instruments inserted into the program that is before the modification item;
a second finding unit configured to find a second instrument of the plurality of instruments inserted into the program that is after the modification item;
a path obtaining unit configured to obtain an execution path of the modified program that is between the first instrument and the second instrument and associated with the modification as well as a constraint set corresponding to the execution path;
an execution result obtaining unit configured to obtain an execution result, outputted by the first instrument, of executing the previous version of the program using an original test case; and
a determining unit configured to determine a test case applicable for the execution path based on the execution result and the constraint set; wherein determining a test case applicable for the execution path comprises:
further defining the constraint set using the execution result to form a combined constraint set;
solving the combined constraint set; and
judging whether the original test case is applicable for the execution path according to the solving result; and further wherein the judging comprises, in a case where the combined constraint set has no solution, determining the original test case not applicable for the execution path;
modifying parameter settings related to local variables in the constraint set to make the combined constraint set have a solution; and
generating a new test case based on the original test case and the modified parameter settings.

8. The apparatus according to claim 7, further comprising an instrument inserting unit configured to insert the plurality of instruments in the program.

9. The apparatus according to claim 7, wherein the first instrument and the second instrument are instruments nearest to the modification item located before and after the modification item respectively.

10. The apparatus according to claim 7, wherein the judging module is configured to, in a case where the combined constraint set has a solution, determine the original test case as the test case applicable for the execution path.

11. The apparatus according to claim 7, wherein the generation module is configured to:
modify the execution result to make the combined constraint set have a solution; and
perform backtracking through the program from the first instrument using data flow analysis to determine a test case which generates the modified execution result and take the determined test case as the new test case.

12. The apparatus according to claim 7, wherein the execution path is a modified execution path corresponding to a specific original path in the previous version of the program, and the original test case is applicable for the specific original path.

* * * * *